United States Patent [19]

Erickson et al.

[11] 4,073,596

[45] Feb. 14, 1978

[54] LUBRICANT COOLING FOR HIGH-SPEED PITOT PUMP

[75] Inventors: John W. Erickson, Huntington Beach; Carter P. Williams, La Crescenta, both of Calif.

[73] Assignee: Kobe, Inc., Huntington Park, Calif.

[21] Appl. No.: 667,891

[22] Filed: Mar. 18, 1976

[51] Int. Cl.² .............................................. F01D 25/24
[52] U.S. Cl. ....................................... 415/180; 415/89; 415/112; 415/175; 233/21
[58] Field of Search ................. 415/180, 109, 89, 112, 415/111, 175, 176, 178; 417/423 R; 233/21

[56] References Cited

U.S. PATENT DOCUMENTS

| 2,017,905 | 10/1935 | Kitto | 415/180 |
| 3,838,939 | 10/1974 | Erickson et al. | 415/109 |

FOREIGN PATENT DOCUMENTS

| 14,291 | 9/1933 | Australia | 415/180 |
| 427,321 | 11/1947 | Italy | 415/176 |
| 3,462 | 5/1919 | Netherlands. | |
| 957,850 | 5/1964 | United Kingdom | 415/180 |

*Primary Examiner*—C. J. Husar
*Attorney, Agent, or Firm*—Christie, Parker & Hale

[57] ABSTRACT

A high-speed pitot pump has a system for self-cooling the lubricant for the bearings supporting the rotatable casing of the pump. The lubricant is contained in a reservoir which is continuously cooled during operation of the pump. The pump has a rotatable casing cantilevered on a shaft in the pump housing. The lubricant cooling system includes blower means which rotate with the casing to draw cool air into the housing and force it through a discharge opening which directs the flow of cool air toward a heat exchanger, preferably a series of cooling fins projecting from an exterior wall of the reservoir.

50 Claims, 3 Drawing Figures

LUBRICANT COOLING FOR HIGH-SPEED PITOT PUMP

BACKGROUND OF THE INVENTION

This invention relates to pitot pumps, and more particularly to a system for self-cooling the lubricant for the bearings of a high-speed pitot pump.

Generally speaking, a pitot pump has a fixed housing and a rotatable casing mounted on the end of a drive shaft supported by high-speed bearings such as roller or ball bearings. A fixed pitot tube is mounted in the casing for withdrawing fluid from near the periphery of the casing as the casing rotates. This results in high pressure fluid being discharged through an outlet from the rotatable casing. The casing typically is secured to an axial shaft driven by a prime mover such as an electric motor. Pitot pumps which operate at speeds of about 3500 rpm typically have grease lubricated bearings for supporting the casing shaft. Such pitot pumps are described and illustrated in U.S. Pat. Nos. 3,384,024 and 3,795,459, for example.

In high-speed pitot pumps operating at about 5000 to 8500 rpm grease lubricated bearings are not satisfactory and lubricating oil is preferred for lubricating the bearings. The lubricating oil becomes relatively hot during continuous high-speed operation of the pump. If the lubricating oil becomes excessively hot, its lubricity can be degraded, resulting in premature bearing failure. Hence, there is a need for a system to prevent excessive heat build-up in the lubricant used for the bearings in such pumps.

BRIEF SUMMARY OF THE INVENTION

The present invention, according to a presently preferred embodiment, provides an improved system for cooling the bearing lubricant in a high-speed pitot pump hving a fixed housing and a rotatable casing in the housing. The lubricant cooling system includes a heat exchanger in heat transfer contact with the bearing lubricant, means for introducing a flow of air into the housing relatively nearer the casing axis of rotation, and means for discharging the air flow from the housing relatively nearer the outer periphery of the housing. The discharged air flow is directed toward the heat exchanger to continuously cool the bearing lubricant during operation of the pump.

In one form of the invention, the air flow is produced by blower means in the pump housing which rotate with the casing. The heat exchanger preferably comprises a series of cooling fins on a wall portion of a reservoir for containing a supply of bearing lubricant.

Another form of the invention is for pitot pump used to pump fluids under elevated temperatures. The air flow for cooling the lubricant is generated by a fan structure in the pump housing which is thermally isolated from the rotatable casing. The fan structure also prevents the air flow from contacting the casing. This prevents the air flow circulated through the housing from being heated by a hot casing.

DRAWINGS

These and other features and advantages of the present invention will be appreciated as the same becomes better understood by reference to the following detailed description when considered in connection with the accompanying drawings in which.

DESCRIPTION

Figure 1:
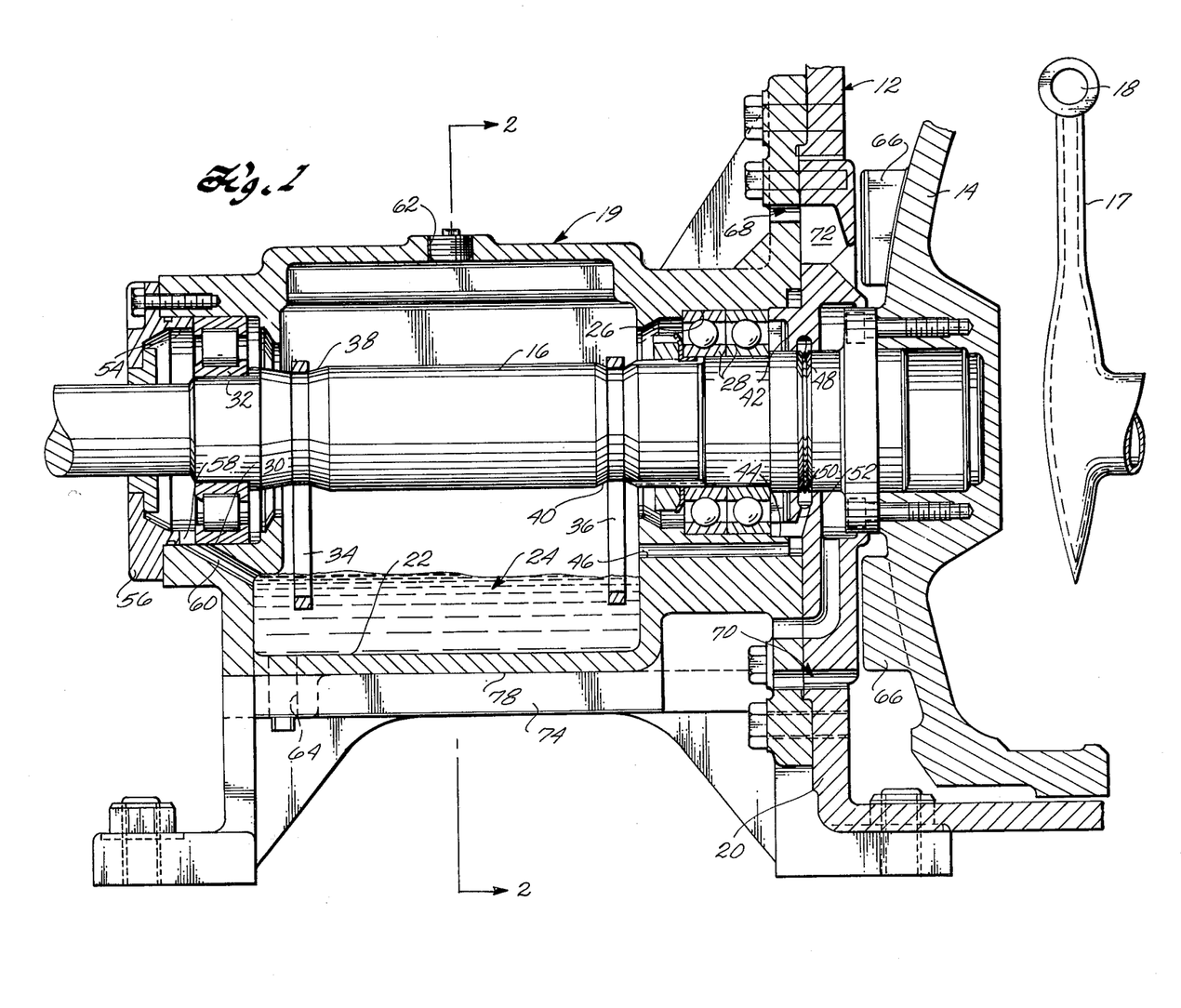
FIG. 1 is a fragmentary longitudinal cross-section of a pitot pump constructed according to principles of this invention, the cross-section being taken on line 1—1 of FIG. 2.

FIG. 1 illustrates a longitudinal cross-section of an embodiment of the pitot pump constructed according to principles of this invention. The pitot pump is a type primarily used in high-speed applications, for example, 5000 to 8000 rpm. The pump has a fixed outer housing which includes a pump housing 12 containing the portion of the pump which pressurizes an incoming fluid and discharges it at a higher pressure. Many details of this section of the pitot pump are conventional and therefore are not illustrated in the drawings. Details of this portion of this pump are similar to those disclosed, for example, in U.S. Pat. No. 3,838,939 owned by Kobe Inc., the assignee of this application. To briefly describe this section of the pump, the pump housing 12 is generally in the form of a short cylinder. A rotatable casing 14 is mounted in the interior of the housing 12. The casing is cantilevered on the end of an elongated axial drive shaft 16 which is connected to a prime mover such as an electric motor (not shown). During use of the pump, fluid is introduced to the interior of the casing 14. A fixed pitot tube 17 is mounted in the casing interior, and as the casing rotates the fluid in the casing also rotates. A high velocity portion of the rotating fluid near the periphery of the casing is withdrawn by the inlet 18 of the pitot tube 17. The fluid then passes through the pitot tube for discharge through an outlet passage (not shown). This much of the pitot pump 10 is conventional and additional details and operation of such pump will be apparent to one skilled in the art.

The outer housing of the pump includes a shell 19 secured to an upright end wall 20 of the pump housing 12. The shaft 16 extends axially through the shell 19 and the pump housing 12. The shell 19 has a hollow interior area forming a reservoir 22 for containing a supply of bearing lubricant 24 such as oil. A first axial bore 26 formed in the shell adjacent one end of the reservoir carries ball bearings 28 for supporting the shaft 16 adjacent to the casing 14. A second axial bore 30 formed in the shell at the opposite end of the reservoir carries a roller bearing 32 for supporting the shaft 16 adjacent to its connection to the prime mover. The ball bearings 28 and roller bearing 32 only support the shaft 16 and the casing 14 for rotation. There is no bearing support for the opposite end of the casing.

Since the pitot pump 10 is generally used for high-speed applicatiions, the bearings 28 and 32 must be constantly lubricated with oil 24 from the reservoir 22 during operation of the pump. FIG. 1 best illustrates a presently preferred system for lubricating the bearings in which a pair of axially spaced apart oil rings 34 and 36 are loosely hung on the top edge of the shaft 16 so the oil rings dip into the oil supply 24. The oil rings 34 and 36 are kept from moving axially on the rotating shaft 16 by placing them in corresponding annular recesses 38 and 40, respectively, formed in the outside surface of the shaft 16. During operation of the pump the oil rings 34 and 36 freely rotate and pick up oil 24 from the reservoir 22. The oil from the oil rings coats the outer surface of the shaft 16, and the constant rotation of the shaft causes the oil to migrate axially along the shaft to lubricate the bearings 28 and 32.

Lubricating oil which migrates away from the ball bearings 28 circulates back to the reservoir 22 through a first oil circulation path which includes an annulus 42 in housing 12 adjacent to the bearings 28, a passage 44 located below the annulus 42, and return passage 46 extending longitudinally from the bottom of the passage 44 and opening through a side wall of the reservoir 22. A second oil circulation path for oil migrating away from the first oil circulation path is provided by a second annular recess 48 formed in the axial passage through the housing 12 around the outer surface of the shaft 16. The second annular recess 48 is spaced axially from the first annulus 42 toward the rotatable casing. A series of axially spaced apart, circular notches 50 are formed on the outer surface portion of the shaft located inside the oil passage 48 to provide an oil slinger. Oil which migrates into the oil slinger is substantially prevented from migrating further along the shaft 16 toward the casing 14. The oil from the oil slinger is circulated back to the reservoir 22 through a passage 52 which leads away from the bottom of the second annular recess 48 and opens into passage 44 and the return passage 46.

An oil circulation path also is provided for lubricating oil which migrates away from the roller bearing 32. This circulation path includes an annular bore 54 formed in an end plate 56 threaded into the left end of the shell 19 as the pump is viewed in FIG. 1. The bore 54 surrounds the end of the roller bearing 32 remote from the reservoir. Oil which circulates into the bore 54 drains back to the reservoir 22 through a radial passage 58 leading away from the bottom of the bore and into an inclined drainage passage 60 extending into the reservoir 22.

The shell 19 also includes an upper oil supply opening 62 for adding lubricating oil to the reservoir 22, and a lower discharge opening 64 for draining oil from the reservoir 22.

High-speed pitot pumps of this type generate high internal heat levels during constant high-speed operation of the pump. Resultant high temperatures could break down the lubricity of the oil used to lubricate the bearings, eventually resulting in premature bearing failure. Means are therefore provided for dissipating a substantial amount of the heat generated internally during operation of a high-speed pitot pump. Much of the heat is transferred to the lubricating oil supply contained in the reservoir. According to the practice of this invention, a system is provided for continuously self-cooling the oil supply in the reservoir 22 during operation of the pump. The cooling system constantly carries off heat from the vicinity of the oil reservoir. This maintains the temperature of the lubricating oil at a sufficiently low level that the lubricity of the oil applied to the bearings is not diminished by high temperatures, thereby extending the life of the bearings.

Figure 2:
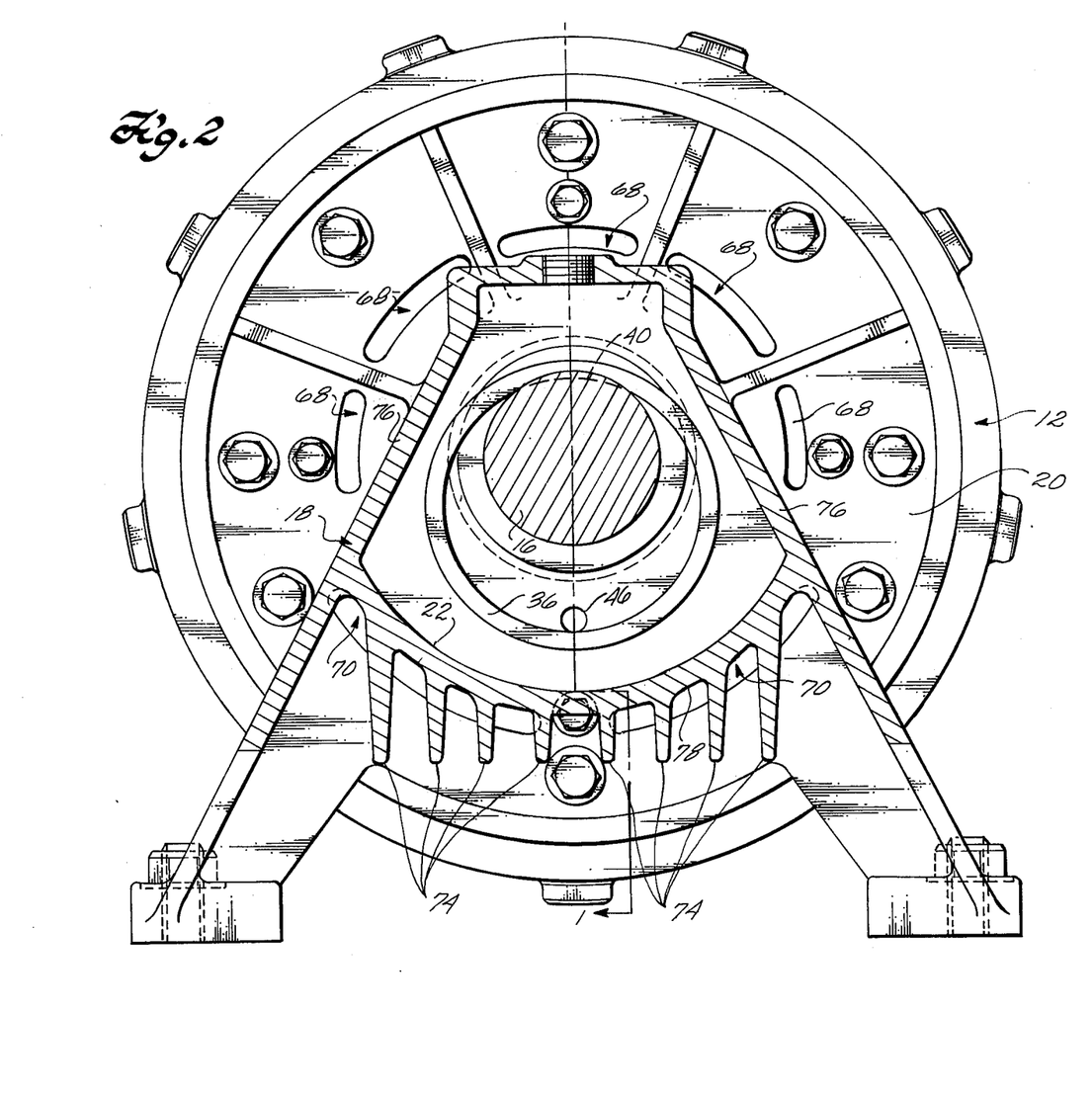
FIG. 2 is a transverse cross-section taken on line 2—2 of FIG. 1.

The cooling system of the present invention includes means for constantly generating a gas pressure gradient in the interior of the pump housing 12 during operation of the pump. The gas pressure gradient produces a continuous flow of cool air under pressure directed from the housing toward the reservoir 22 to cool the supply of lubricating oil contained in the reservoir. In the form of the invention shown in FIGS. 1 and 2, the gas pressure gradient or differential is produced by a plurality of circumferentially spaced apart radial vanes 66 formed on the exterior surface of the casing. The vanes are located on the end wall of the casing which is spaced closely from and faces toward the inside surface of the housing end wall 20. The vanes are of identical size and shape and are spaced equidistantly from the axis of rotation of the shaft 16. By "radial" vanes is meant vanes which extend generally from nearer the axis of the casing to nearer the periphery of the casing, and such vanes can include curved vanes of the type typically used in a turbine.

A series of circumferentially spaced apart, arcuate shaped gas inlet openings 68 extend axially through the housing end wall 20. The gas inlet openings are located in the upper half of the end wall 20 and are spaced apart along an arc at a uniform radius from the axis of the shaft 16. As shown best in FIG. 1, each gas inlet opening 68 opens into a larger internal air passage 72 which opens toward the inner edges of the radial vanes 66.

A pair of circumferentially spaced apart, arcuate gas discharge slots 70 extend axially through the housing end wall 20. The gas discharge slots 70 are spaced apart along an arc at a uniform radius from the rotational axis of the shaft 16. The gas discharge slots are located in the lower half of the housing end wall 20 and face axially toward the portion of the shell 19 which forms the bottom of the reservoir 22.

The gas discharge slots 70 face toward the space in the housing immediately adjacent the outer ends of the radial vanes 66. Thus, the inlet passages 72 are located relatively nearer the casing axis of rotation, and the gas discharge slots 70 are located relatively nearer the periphery of the housing. This arrangement of the gas inlet and outlet passages produces a pressure gradient in the interior of the housing 12 in response to rotation of the vanes 66. The pressure gradient results in a positive gas pressure axially on the lower portion of the housing end wall 20 adjacent the gas discharge slots 70. The pressure gradient generated in the housing draws a stream of cool ambient air from outside the housing through the gas inlet passages 72. The cool air circulates through the housing and is directed outwardly under pressure through the discharge openings 70 toward the shell 18 where the air flow is used to cool the lubricating oil contained in the reservoir 22.

A series of axially extending, laterally spaced apart, parallel cooling fins 74 project downwardly from the bottom exterior surface of the reservoir 22 into the flow path of cool air forced through the gas discharge slots 70. As shown best in FIG. 2, the shell 18 is generally A-shaped in transverse cross-section, with the side walls 76 of the reservoir being straight and converging toward the top of the shell. The bottom wall 78 of the reservoir is arcuate in shape so as to substantially surround all but the top surface of the pool of lubricating oil 24 contained in the reservoir 22. Consequently, the cooling fins 74 are in direct heat transfer contact with the bottom wall portion of the reservoir having intimate contact with the supply of oil for lubricating the bearings 28 and 32. The gas discharge slots 70 are shaped to conform to the contour of the outer surface of the reservoir bottom wall 78. The gas discharge slots 70 also are located so as to direct the axial flow of cool air along the exterior surface 78 of the reservoir bottom wall. The cooling fins 74 are open at their opposite ends and extend substantially the full length of the reservoir bottom wall. Hence, cool air continuously flows between the cooling fins to draw off heat and constantly reduce the temperature of the reservoir bottom wall which, in turn, prevents substantial heat build-up in the supply of lubricating oil contained in the reservoir 22.

Figure 3:
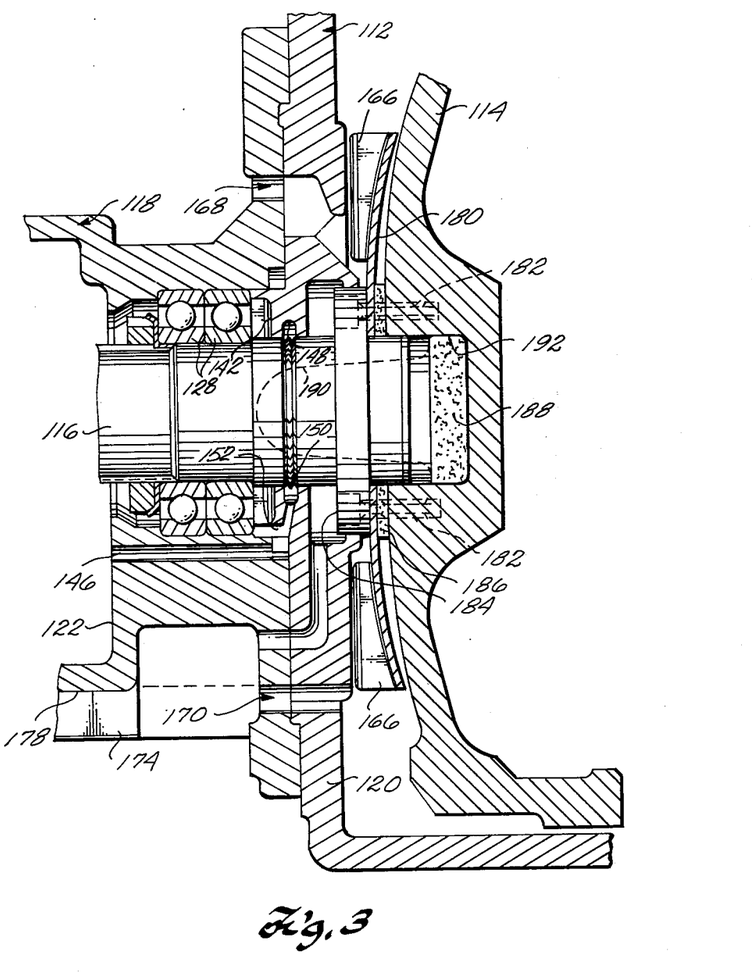
FIG. 3 is a fragmentary longitudinal cross-section illustrating an alternate embodiment of the pitot pump of FIG. 1.

FIG. 3 illustrates a fragmentary longitudinal crossection of an alternate embodiment of a self-cooling pitot pump constructed according to principles of this invention. Many details of this embodiment are similar to those of the pitot pump shown in FIGS. 1 and 2. The embodiment of FIG. 3 includes a pump housing 112 and a rotary casing 114 on an axial shaft 116. The casing 112 includes a pitot tube (not shown) for withdrawing pumped fluid from the casing. A shell 118 adjacent to the housing 112 includes a reservoir 122 for holding a supply of lubricant used to lubricate the ball bearings 128 at one end of the shaft 116 and a roller bearing (not shown) similar to bearing 32 nearer the opposite end of the shaft 116. Oil feed to the roller bearing circulates away from the bearing end back to the reservoir through an oil circulation path (not shown) similar to that for the bearing 32 in FIGS. 1 and 2. Oil fed to the bearings 128 circulates away from the bearings and back to the reservoir 122 through an annulus 142 and a longitudinal return passage 146. Oil is also circulated by an oil slinger formed by a pair of notches 150 formed in the outer surface of the shaft 116 adjacent an annular passage 148.

The pump shown in FIG. 3 generates a continuous flow of cool air which passes axially between cooling fins 174 projecting down from the underside of the bottom wall 178 of the reservoir 122. The cooling fins 174 are identical in construction and arrangement to fins 74 shown in FIGS. 1 and 2. The pump housing 112 includes circumferentially spaced apart, axial gas inlet openings 168 as well as axial gas discharge slots 170 extending through the upper and lower portions, respectively, of the upright end wall 120 of the housing 112. The gas inlet and discharge openings 168 and 170 are similar in configuration and arrangement to their corresponding gas inlet and discharge openings 68 and 70 shown in FIGS. 1 and 2.

The pump illustrated in FIG. 3 is especially useful in continuously cooling lubricant in the reservoir 122 when the pump is used to pump fluids at elevated temperatures. In these instances, the hot fluids being pumped transfer a substantial amont of heat to the walls of the casing 114 which, if it were not for the practice of this invention, could heat the flow of air generated in the housing 112 and prevent the air flow from effectively cooling the supply of lubricant contained in the reservoir 122.

To prevent the air used for cooling from picking up heat from the casing, a fan 180 in the interior of the housing 112 is used to generate the flow of coolant air. The body of the fan 180 is mounted on a flanged portion of the shaft 116. A fan is also mounted so as to isolate the walls of the casing 114 from the flow of air generated in the interior of the housing 112 by the fan. Preferably, the fan body is circular and surrounds the shaft 116, extending radially outwardly to the vicinity of the gas inlet and discharge openings 168 and 170, respectively. The fan body extends between the gas inlet openings 168 and the end wall of the casing 114 closest to the housing end wall 120. A plurality of circumferentially spaced apart radial vanes 166 are located on one face of the fan body 180 near its periphery. The location of the vanes 166 with respect to the inlet openings 168 and the air discharge slots 170 is identical to that of vanes 66 shown in FIGS. 1 and 2. Thus, the fan 180 acts as a blower during rotation of the shaft 116 to produce a gas pressure head or gradient in the interior of the housing 112. This draws a stream of cool ambient air in through the inlet openings 168 and forces the air axially out through the discharge slots 170 and between the cooling fins 174.

The fan body 180 preferably is secured to the end wall of the casing 114 which faces toward the upright end wall 120 of the housing 112. The fan body 180 is secured to the casing 114 by circumferentially spaced apart fasteners 182 extending through a flange 184 on the shaft 116 and then through the fan body 180 and into the end wall of the casing 114. The fan body is thermally isolated from the casing by a ring of appropriate thermal insulation 186, such as pressed asbestos or composite ceramic, which surrounds the shaft 116 and is disposed between the casing and the fan body 118. The end portion of the shaft 116 is thermally isolated from the casing 114 by the shank portions of the fasteners 182 being necked down for a substantial portion of their length. The shaft 116 is further thermally isolated from the casing 114 by a body of thermal insulation 188 disposed in a hollowed end portion 190 of the shaft 116. The thermal insulation 188 can be any of a number of known heat resistant materials, such as fiberglass, cellulosic fiber, rock wool, kieselguhr, or the like. A portion of the thermal insulation 188 projects outwardly from the end of the shaft 116 and occupies the space 192 between the end of the shaft 116 and the axial recessed area in the wall of the casing which surrounds the shaft 116.

When the pump shown in FIG. 3 is used to pump high temperature fluids, the heat conducted by the fluids to the casing is substantially prevented from heating the flow of coolant gas generated by the fan 180. The fan body itself isolates the flow of air in the housing from direct heat transfer contact with the heated walls of the casing, thereby keeping the air flow cool. The fan body is isolated from high temperatures by the ring of thermal insulation 186.

The ball bearings 128 are isolated from high temperatures by the body of thermal insulation 188 which resists heat transfer along the shaft 116 to the bearings.

Thus, the pitot pump of this invention automatically generates a flow of cool air for continuously cooling the supply of bearing lubricant during operation of the pump. The flow of cool air constantly draws off heat from the reservoir of lubricant contained in the pump so that the lubricant which is then applied to the bearings will have the lubricity necessary to effectively lubricate the bearings. The velocity of cool air directed at the cooling fins is proportional to the rotational speed of the pump. Hence, an increase in the speed of a pump which can generate higher internal heat levels will produce a resulting higher flow rate of cool air to draw off the additional heat.

What is claimed is:

1. In a pitot pump having a fixed housing having a hollow interior, a rotatable casing in the interior of the housing, a fixed pitot tube for withdrawing pressurized fluid from within the casing, and bearing means for mounting the casing for rotation in the interior of the housing; improved means for cooling the bearing means during rotation of the casing, comprising:

a shell located adjacent to the housing, the shell having a hollow interior forming a reservoir for containing a supply of lubricant;

means for lubricating the bearing means with lubricant removed from the reservoir;

a gas inlet opening communicating between the atmosphere and the hollow interior of the housing;

heat exchange means in heat transfer contact with the reservoir shell;

a gas discharge opening communicating with the hollow interior of the housing and facing toward the heat exchange means; and means for generating a gas pressure gradient in the interior of the housing with rotation of the casing to draw air from outside the housing through the gas inlet opening into the interior of the housing and to discharge the air under pressure from the interior of the housing through the gas discharge opening and toward the heat exchange means to cool said reservoir shell and hence the lubricant contained in the reservoir.

2. In a pitot pump according to claim 1, the improvement in which the gas inlet opening is relatively nearer the casing axis of rotation, and the gas discharge opening is relatively nearer the periphery of the housing.

3. In a pitot pump according to claim 1, the improvement including a rotatable shaft extending axially through the housing; means securing the casing to the shaft for rotation therewith; and thermal insulation means between the shaft and the casing to reduce conduction of heat from the casing to the shaft.

4. In a pitot pump according to claim 1, the improvement in which the heat transfer means are open to the atmosphere.

5. In a pitot pump according to claim 1, the improvement in which the reservoir shell has an exterior bottom wall for holding a supply of lubricant; and the heat exchange means comprises a plurality of spaced apart, elongated cooling fins extending along the exterior bottom wall of the reservoir shell, the cooling fins being open to the atmosphere; and in which the gas discharge opening is located so as to discharge the flow of air lengthwise between the cooling fins.

6. In a pitot pump according to claim 1, the improvement in whch the means for generating a gas pressure gradient includes circumferentially spaced apart vanes located in the hollow interior of the housing and rotatable with rotation of the casing.

7. In a pitot pump according to claim 6, the improvement in which each vane has an inner edge spaced from the casing axis of rotation and an outer edge located farther from said axis of rotation than said inner edge; and in which the gas inlet opening is adjacent the inner edges of the rotating vanes, and the gas discharge opening is adjacent the outer edges of the rotating vanes.

8. In a pitot pump according to claim 6, the improvement in which the housing has an end wall located adjacent to said vanes; and in which the gas inlet and discharge openings extend through said end wall on opposite sides of the casing axis of rotation.

9. In a pitot pump according to claim 8, the improvement in which the end wall of the housing has an upper portion above the casing axis of rotation and a lower portion below the casing axis of rotation; the gas inlet opening extends through the upper portion of the end wall, and the gas discharge opening extends through the lower portion of the end wall; the reservoir shell has a bottom portion adjacent said end wall for holding the supply of lubricant; and the heat exchange means are in heat transfer contact with the bottom portion of the reservoir shell.

10. In a pitot pump according to claim 9, the improvement in which the bottom portion of the reservoir shell surrounds a substantial surface area of a pool of lubricant contained in the reservoir.

11. In a pitot pump according to claim 9, the improvement in which the heat exchange means comprises a plurality of spaced apart, elongated cooling fins extending generally parallel to one another along the bottom portion of the reservoir shell; and the gas discharge opening is located so as to direct the flow of air lengthwise between the cooling fins.

12. In a pitot pump according to claim 11, the improvement in which the cooling fins are open at their opposite ends and extend along substantially the entire length of the reservoir bottom.

13. In a pitot pump according to claim 1, the improvement in which the means for generating a gas pressure gradient comprises rotatable fan means located in the interior of the housing between the gas inlet opening and the casing, the fan means having circumferentially spaced apart vanes located with respect to the gas inlet and discharge openings so that rotation of the fan means generates said gas pressure gradient in the housing.

14. In a pitot pump according to claim 13, the improvement in which the fan means includes a fan body surrounding the casing axis of rotation and being rotatable with the casing, the fan body extending between the gas inlet opening and the casing to substantially isolate air flowing in the housing, between the gas inlet and discharge openings, from contact with the casing.

15. In a pitot pump accoding to claim 14, the improvement including thermal insulation means surrounding the casing axis of rotation and located between the casing and the fan body to reduce conduction of heat from the casing to the fan body.

16. In a pitot pump according to claim 13, the improvement in which each vane has an inner edge spaced from the casing axis of rotation and an outer edge located farther from said axis of rotation than said inner edge; and in which the gas inlet opening is adjacent the inner edges of the rotating vanes, and the gas discharge opening is adjacent the outer edges of the rotating vanes.

17. A pitot pump comprising:
a fixed housing having a hollow interior;
a rotatable casing in the interior of the housing and having a fixed pitot tube therein for withdrawing pressurized fluid from the casing;
bearing means in the housing for mounting the casing for rotation therein;
a shell located adjacent to the housing, the shell having a hollow interior forming a reservoir for containing a supply of lubricant;
means for lubricating the bearing means with lubricant removed from the reservoir; and
means for cooling the lubricant in the reservoir during rotation of the casing comprising:
a gas inlet opening communicating between the atmosphere and the hollow interior of the housing;
heat exchange means in heat transfer contact with the reservoir shell;
a gas discharge opening communicating with the hollow interior of the housing and facing toward said heat exchange means; and
means for generating a gas pressure gradient in the interior of the housing with rotation of the casing to draw air from outside the housing through the gas inlet opening into the interior of the housing and to discharge the air under pressure from the interior of the housing through the gas discharge opening and toward the heat exchange means to cool the reservoir shell and hence the lubricant contained in the reservoir.

18. A pitot pump according to claim 17 in which the heat transfer means are open to the atmosphere.

19. A pitot pump according to claim 17 in which the gas inlet opening is relatively nearer the casing axis of rotation, and the gas discharge opening is relatively nearer the periphery of the housing.

20. A pitot pump according to claim 19 in which the means for generating a gas pressure gradient includes circumferentially spaced apart vanes located in the hollow interior of the housing and rotatable with rotation of the casing.

21. A pitot pump according to claim 20 in which each vane has an inner edge spaced from the casing axis of rotation and an outer edge located farther from the casing axis of rotation than said inner edge; and in which the gas inlet opening is adjacent the inner edges of the rotating vanes, and the gas discharge opening is adjacent the outer edges of the rotating vanes.

22. A pitot pump according to claim 21 in which the housing has an end wall located adjacent to said vanes; and in which the gas inlet and discharge openings extend through said end wall on opposite sides of the casing axis of rotation.

23. A pitot pump according to claim 22 in which the end wall of the housing has an upper portion above the casing axis of rotation and a lower portion below the casing axis of rotation; and the gas inlet opening extends through the upper portion of the end wall, and the gas discharge opening extends through the lower portion of the end wall.

24. A pitot pump according to claim 17 in which the reservoir shell has a bottom wall in contact with the supply of lubricant contained in the reservoir; and the heat exchange means are in heat transfer contact with the bottom wall of the reservoir.

25. A pitot pump according to claim 24 in which said bottom wall of the reservoir surrounds a substantial surface area of a pool of lubricant contained in the reservoir.

26. A pitot pump according to claim 24 in which the heat exchange means comprises a plurality of spaced apart, elongated cooling fins extending generally parallel to one another along the bottom wall of the reservoir shell; and the gas discharge opening is located so as to direct the flow of air lengthwise between the cooling fins.

27. A pitot pump according to claim 26 in which the cooling fins are open at their opposite ends and extend along substantially the entire length of the reservoir bottom wall.

28. A pitot pump according to claim 26 in which the cooling fins are open to the atmosphere.

29. A pitot pump according to claim 17 in which the means for generating a gas pressure gradient comprises rotatable fan means located in the hollow interior of the housing between the gas inlet opening and the casing, the fan means having circumferentially spaced apart vanes, the vanes being located with respect to the gas inlet and discharge openings so that rotation of the fan means generates said gas pressure gradient in the housing.

30. A pitot pump according to claim 29 including thermal insulation means surrounding the casing axis of rotation and located between the casing and the fan means to reduce conduction of heat from the casing to the fan means.

31. A pitot pump according to claim 29 in which the fan means includes a fan body surrounding the casing axis of rotation and being rotatable with the casing, the fan body extending between the gas inlet opening and the casing to substantially isolate air flowing the housing, between the gas inlet and discharge openings, from contact with the casing.

32. A pitot pump according to claim 31 in which each vane has an inner edge spaced from the casing axis of rotation and an outer edge located farther from the said axis of rotation than said inner edge; and in which the gas inlet opening is adjacent the inner edges of the rotating vanes, and the gas discharge opening is adjacent the outer edges of the rotating vanes.

33. A pitot pump according to claim 31 including a rotatable shaft extending axially through the housing; means for securing the casing to the shaft for rotation therewith; and thermal insulation means between the shaft and the casing to reduce conduction of heat from the casing to the shaft.

34. A pitot pump according to claim 33 including thermal insulation means surrounding the rotatable shaft and located between the casing and the fan means to reduce conduction of heat from the casing to the fan means.

35. A pitot pump comprising:
(a) a fixed outer housing having a hollow interior;
(b) a fixed shell located adjacent to the housing, the shell having a hollow interior forming a reservoir for containing a supply of lubricant, said lubricant being in contact with an inner surface of a wall portion of the shell;
(c) a rotatable shaft extending axially through the interior of the shell and the housing;
(d) a casing in the housing interior secured to the shaft so as to rotate therewith, the casing having a hollow interior;
(e) a fixed pitot tube in the interior of the casing for withdrawing pressurized fluid from the casing;
(f) bearing means located between the reservoir and the interior of the housing for mounting the shaft for rotation;
(g) means for lubricating the bearing means with lubricant removed from the reservoir; and
(h) means for cooling the lubricant contained in the reservoir, the lubricant cooling means comprising:
(1) a series of axially extending and laterally spaced apart, elongated cooling fins in heat transfer contact with an outer surface of said wall portion of the shell,
(2) circumferentially spaced apart vanes located in the interior of the housing, the vanes being rotatable with the casing about the axis of the shaft,
(3) a gas discharge opening in the housing adjacent the cooling fins, the gas discharge opening communicating between the hollow interior of the housing and facing toward the cooling fins,
(4) a gas inlet opening in the housing adjacent the vanes of the casing, the gas inlet opening communicating between the atmosphere and the hollow interior of the housing, the gas inlet opening being located relatively nearer the casing axis of rotation and the gas discharge opening being located relatively nearer the periphery of the housing, and (5) means for generating a gas pressure gradient in the housing interior with rotation of the shaft and the casing to draw ambient air through the gas inlet opening and circulate the air through the housing interior and discharge it from the interior of the housing through the discharge opening toward the cooling fins to cool said wall portion of the shell and hence the lubricant contained in the reservoir.

36. A pitot pump according to claim 35 in which the cooling fins are open to the atmosphere.

37. A pitot pump comprising:
(a) a fixed outer housing having a hollow interior;
(b) a fixed shell located adjacent to the housing, the shell having a hollow interior forming a reservoir for containing a supply of lubricant in contact with an inner surface of a wall portion of the shell;
(c) a rotatable shaft extending axially through the interior of the shell and the housing;
(d) a casing in the housing interior secured to the shaft so as to rotate therewith, the casing having a hollow interior;
(e) a fixed pitot tube in the interior of the casing for withdrawing pressurized fluid from the casing;
(f) bearing means located between the reservoir and the interior of the housing for mounting the shaft for rotation;
(g) means for lubricating the bearing means with lubricant removed from the reservoir; and
(h) means for cooling the lubricant contained in the reservoir, the lubricant cooling means comprising:
(1) a series of axially extending and laterally spaced apart, elongated cooling fins in heat transfer contact with an outer surface of said wall portion of the shell,
(2) a gas discharge opening in the housing adjacent the cooling fins, the gas discharge opening communicating with the hollow interior of the housing and facing toward the cooling fins,
(3) a gas inlet opening in the housing communicating between the atmosphere and the hollow interior of the housing,
(4) rotatable fan means located in the interior of the housing and secured to the shaft so as to rotate therewith, the fan means having circumferentially spaced apart vanes facing toward said gas inlet and discharge openings, the gas inlet opening being located relatively nearer the casing axis of rotation and the gas discharge opening being located relatively nearer the periphery of the housing, and
(5) means for rotating the fan means so that rotation of the vanes generates a gas pressure gradient in the housing interior to draw ambient air from outside the housing through the gas inlet opening and to circulate the air through the housing interior and discharge it from the interior of the housing through the gas discharge opening toward the cooling fins to cool said wall portion of the shell and hence the lubricant contained in the reservoir, the fan means projecting between the gas inlet opening and the casing so as to substantially isolate generated air flow within the housing from contact with the casing.

38. A pitot pump according to claim 37 including thermal insulation means between the shaft and the casing to reduce conduction of heat from the casing to the shaft.

39. A pitot pump according to claim 37 including thermal insulation means surrounding the shaft and located between the casing and the fan means to reduce conduction of heat from the casing to the fan means.

40. A pitot pump according to claim 37 in which the cooling fins are open to the atmosphere.

41. In a pitot pump having a fixed housing and a rotatable casing mounted on bearings in the housing, improved means for cooling bearing lubricant comprising heat exchange means in heat transfer contact with the bearing lubricant, means for drawing air from the atmosphere into the housing relatively nearer the casing axis of rotation, and means for discharging the air under pressure from the housing from relatively nearer the periphery of the housing toward the heat exchange means to draw heat away from the heat exchange means for cooling the bearing lubricant.

42. In a pitot pump according to claim 41, the improvement comprising means on the rotatable casing for producing a radial pressure gradient within the housing with air pressure below ambient pressure relatively nearer the axis of rotation and above ambient pressure relatively nearer the periphery.

43. A pitot pump according to claim 41 in which the heat exchange means are open to the atmosphere.

44. In a pitot pump having a fixed housing, a rotatable casing in the housing, a fixed pitot tube for withdrawing pressurized fluid from within the casing, and bearing means for mounting the casing for rotation in the housing; improved means for cooling the bearing means during rotation of the casing, comprising:
a reservoir for containing a supply of lubricant;
means for lubricating the bearing means with lubricant removed from the reservoir;
a gas inlet opening in the housing;
heat exchange means in heat transfer contact with the reservoir;
a gas discharge opening in the housing facing toward the heat exchange means;
rotatable fan means located in the housing between the gas inlet opening and the casing, the fan means having circumferentially spaced apart vanes located with respect to the gas inlet and discharge openings so that rotation of the fan means generates a gas pressure gradient in the housing to draw air from outside the housing through the gas inlet opening and to discharge the air under pressure through the gas discharge opening toward the heat exchange means to cool said reservoir and hence the lubricant contained in the reservoir, the fan means including a fan body surrounding the casing axis of rotation and being rotatable with the casing, the fan body extending between the gas inlet opening and the casing to substantially isolate air flow between the gas inlet and discharge openings from contact with the casing; and
thermal insulation means surrounding the casing axis of rotation and located between the casing and the fan body to reduce conduction of heat from the casing to the fan body.

45. In a pitot pump having a fixed housing, a rotatable casing in the housing, a fixed pitot tube for withdrawing pressurized fluid from within the casing, and bearing means for mounting the casing for rotation in the housing; improved means for cooling the bearing means during rotation of the casing, comprising:

a reservoir for containing a supply of lubricant;
means for lubricating the bearing means with lubricant removed from the reservoir;
a gas inlet opening in the housing;
heat exchange means in heat transfer contact with the reservoir;
a gas discharge opening in the housing facing toward the heat exchange means;
a rotatable shaft extending axially through the housing, and means securing the casing to the shaft for rotation therewith;
means for generating a gas pressure gradient in the housing with rotation of the casing to draw air from outside the housing through the gas inlet opening and to discharge the air under pressure through the discharge opening toward the heat exchange means to cool said reservoir and hence the lubricant contained in the reservoir; and
thermal insulation means between the shaft and the casing to reduce conduction of heat from the casing to the shaft.

46. A pitot pump comprising:
(a) a fixed housing having a hollow interior;
(b) a rotatable casing in the housing interior having a fixed pitot tube therein for withdrawing pressurized fluid from the casing;
(c) bearing means in the housing for mounting the casing for rotation therein;
(d) a reservoir for containing a supply of lubricant;
(e) means for lubricating the bearing means with lubricant removed from the reservoir; and
(f) means for cooling the lubricant in the reservoir during rotation of the casing comprising:
(1) a gas inlet opening in the housing;
(2) heat exchange means in heat transfer contact with the reservoir,
(3) a gas discharge opening in the housing facing toward said heat exchange means,
(4) rotatable fan means located in the housing between the gas inlet opening and the casing, the fan means having circumferentially spaced apart vanes, the vanes being located with respect to the gas inlet and discharge openings so that rotation of the fan means generates a gas pressure gradient in the housing with rotation of the casing to draw air from outside the housing through the gas inlet opening relatively nearer the casing axis of rotation and to discharge the air under pressure from relatively nearer the periphery of the housing through the gas discharge opening therein toward the heat exchange means to cool the reservoir and hence the lubricant contained in the reservoir, and
(5) thermal insulation means surrounding the casing axis of rotation and located between the casing and the fan means to reduce conduction of heat from the casing to the fan means.

47. A pitot pump comprising:
(a) a fixed housing;
(b) a rotatable casing in the housing having a fixed pitot tube therein for withdrawing pressurized fluid from the casing;
(c) bearing means in the housing for mounting the casing for rotation therein;
(d) a reservoir for containing a supply of lubricant;
(e) means for lubricating the bearing means with lubricant removed from the reservoir; and (f) means for cooling the lubricant in the reservoir during rotation of the casing comprising:
(1) a gas inlet opening in the housing,
(2) heat exchange means in heat transfer contact with the reservoir,
(3) a gas discharge opening in the housing facing toward said heat exchange means,
(4) a rotatable shaft extending axially through the housing and means securing the casing to the shaft for rotation therewith,
(5) means for generating a gas pressure gradient in the housing with rotation of the casing to draw air from outside the housing through the gas inlet opening and discharge the air under pressure through the gas discharge opening toward the heat exchange means to cool the reservoir and hence the lubricant contained in the reservoir, and
(6) thermal insulation means between the shaft and the casing to reduce conduction of heat from the casing to the shaft.

48. A pitot pump according to claim 47 including rotatable fan means located in the housing between the gas inlet opening and the casing, the fan means having circumferentially spaced apart vanes, the vanes being located with respect to the gas inlet and discharge openings so that rotation of the fan means generates said gas pressure gradient in the housing, the fan means including a fan body surrounding the casing axis of rotation and being rotatable with the casing, and thermal insulation means surrounding the rotatable shaft and located between the casing and the fan body to reduce conduction of heat from the casing to the fan body.

49. A pitot pump comprising:
(a) a fixed outer housing having a hollow interior;
(b) a fixed shell located adjacent the housing, the shell having a hollow interior forming a reservoir for containing a supply of lubricant in contact with an inner surface of a wall portion of the shell;
(c) a rotatable shaft extending axially through the interior of the shell and the housing;
(d) a casing in the interior of the housing secured to the shaft so as to rotate therewith, the casing having a hollow interior;
(e) a fixed pitot tube in the interior of the casing for withdrawing pressurized fluid from the casing;
(f) bearing means located between the reservoir and the interior of the housing for mounting the shaft for rotation;
(g) means for lubricating the bearing means with lubricant removed from the reservoir; and
(h) means for cooling the lubricant contained in the reservoir, the lubricant cooling means comprising:
(1) a series of axially extending and laterally spaced apart, elongated cooling fins in heat transfer with said wall portion of the shell,
(2) a gas discharge opening in the housing adjacent the cooling fins,
(3) a gas inlet opening in the housing,
(4) rotatable fan means located in the interior of the housing and secured to the shaft so as to rotate therewith, the fan means having circumferentially spaced apart vanes facing toward said gas inlet and discharge openings, the gas inlet opening being located relatively nearer the casing axis of rotation and the gas discharge oepning being located relatively nearer the periphery of the housing so that rotation of the vanes generates a gas pressure gradient in the housing interior to draw ambient air through the gas inlet opening and circulate the air through the housing interior and discharge it through the discharge opening toward the cooling fins to cool said wall portion of the shell and hence the lubricant contained in the reservoir, and (5) thermal insulation means surrounding the shaft and located between the casing and the fan means to reduce conduction of heat from the casing to the fan means.

50. A pitot pump comprising:
(a) a fixed outer housing having a hollow interior;
(b) a fixed shell located adjacent the housing, the shell having a hollow interior forming a reservoir for containing a supply of lubricant in contact with an inner surface of a wall portion of the shell;
(c) a rotatable shaft extending axially through the interior of the shell and the housing;
(d) a casing in the interior of the housing secured to the shaft so as to rotate therewith, the casing having a hollow interior;
(e) a fixed pitot tube in the interior of the casing for withdrawing pressurized fluid from the casing;
(f) bearing means located between the reservoir and the interior of the housing for mounting the shaft for rotation;
(g) means for lubricating the bearing means with lubricant removed from the reservoir; and
(h) means for cooling the lubricant contained in the reservoir, the lubricant cooling means comprising:
   (1) a series of axially extending and laterally spaced apart, elongated cooling fins in heat transfer with said wall portion of the shell,
   (2) a gas discharge opening in the housing adjacent the cooling fins,
   (3) a gas inlet opening in the housing,
   (4) a plurality of circumferentially spaced apart vanes located in the interior of the housing for rotating with the casing, the vanes facing toward said gas inlet and discharge openings, the gas inlet opening being located relatively nearer the casing axis of rotation and the gas discharge opening being located relatively nearer the periphery of the housing so that rotation of the vanes generates a gas pressure gradient in the housing interior to draw ambient air through the gas inlet opening and circulate the air through the housing interior and discharge it through the gas discharge opening toward the cooling fins to cool said wall portion of the shell and hence the lubricant contained in the reservoir, and
   (5) thermal insulation means between the shaft and the casing to reduce conduction of heat from the casing to the shaft.

* * * * *